(12) United States Patent
Imafuku

(10) Patent No.: US 9,989,151 B2
(45) Date of Patent: Jun. 5, 2018

(54) TRANSFER FOR VEHICLE

(71) Applicant: TOYOTA JIDOSHA KABUSHIKI KAISHA, Toyota-shi, Aichi-ken (JP)

(72) Inventor: Mizuki Imafuku, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/284,932

(22) Filed: Oct. 4, 2016

(65) Prior Publication Data

US 2017/0122434 A1 May 4, 2017

(30) Foreign Application Priority Data

Oct. 28, 2015 (JP) .................................. 2015-212361

(51) Int. Cl.
| | |
|---|---|
| *F16H 63/04* | (2006.01) |
| *B60K 17/08* | (2006.01) |
| *B60K 17/344* | (2006.01) |
| *B60K 23/08* | (2006.01) |
| *F16H 37/06* | (2006.01) |
| *B60K 17/35* | (2006.01) |
| *F16H 63/06* | (2006.01) |
| *F16H 63/30* | (2006.01) |

(52) U.S. Cl.
CPC ............ *F16H 63/04* (2013.01); *B60K 17/08* (2013.01); *B60K 17/344* (2013.01); *B60K 17/35* (2013.01); *B60K 23/0808* (2013.01); *F16H 37/065* (2013.01); *F16H 63/062* (2013.01); *B60Y 2400/405* (2013.01); *B60Y 2400/414* (2013.01); *B60Y 2400/82* (2013.01); *F16H 2063/3056* (2013.01); *F16H 2063/3066* (2013.01)

(58) Field of Classification Search
CPC ....... F16H 63/04; F16H 37/065; B60K 17/08; B60K 17/344; B60K 23/0808; B60Y 2400/405; B60Y 2400/414; B60Y 2400/82

See application file for complete search history.

(56) References Cited

U.S. PATENT DOCUMENTS

| | | | | |
|---|---|---|---|---|
| 5,984,821 | A * | 11/1999 | Showalter | .......... B60K 17/3467 475/204 |
| 6,779,641 | B2 | 8/2004 | Vonnegut et al. | |
| 9,772,035 | B2 * | 9/2017 | Imafuku | ............... F16H 63/304 |
| 2003/0032519 | A1 * | 2/2003 | Lovatt | ..................... F16D 7/027 475/204 |
| 2004/0162176 | A1 * | 8/2004 | Foster | ................ B60K 17/3462 475/210 |
| 2006/0011001 | A1 * | 1/2006 | Showalter | .......... B60K 23/0808 74/23 |
| 2007/0251345 | A1 | 11/2007 | Kriebernegg et al. | |
| 2010/0089199 | A1 | 4/2010 | Lafer et al. | |

(Continued)

FOREIGN PATENT DOCUMENTS

| | | |
|---|---|---|
| JP | 2010-151309 A | 7/2010 |
| JP | 2016-074342 A | 5/2016 |

*Primary Examiner* — Drew J Brown

(74) *Attorney, Agent, or Firm* — Oliff PLC

(57) ABSTRACT

A drum cam is connected to a first annular member in a ball cam provided on a rear wheel-side output shaft. Furthermore, linear motion of a second annular member in the ball cam provided on the rear wheel-side output shaft is transmitted to a front wheel-driving clutch via a first transmission mechanism.

5 Claims, 6 Drawing Sheets

(56) References Cited

U.S. PATENT DOCUMENTS

| | | | | |
|---|---|---|---|---|
| 2014/0041468 A1* | 2/2014 | Yukitake | ................ | F16H 61/32 |
| | | | | 74/63 |
| 2016/0096429 A1 | 4/2016 | Imafuku et al. | | |
| 2016/0377156 A1* | 12/2016 | Robles | ................ | F16H 37/065 |
| | | | | 475/269 |
| 2017/0037961 A1* | 2/2017 | Pritchard | ................ | F16H 61/18 |

* cited by examiner

TRANSFER FOR VEHICLE

INCORPORATION BY REFERENCE

The disclosure of Japanese Patent Application No. 2015-212361 filed on Oct. 28, 2015 including the specification, drawings and abstract is incorporated herein by reference in its entirety.

BACKGROUND OF THE INVENTION

1. Field of the Invention

The present invention relates to a technique for downsizing a transfer for a vehicle, the transfer including a high/low switching mechanism that changes a speed of rotation of an input shaft and transmits the rotation to an output shaft, and a clutch that transmits a part of motive power to the output shaft or shuts off the transmission, or adjusts a torque to be transmitted to the output member, compared to conventional transfers.

2. Description of Related Art

For example, transfers each including an input shaft, an output shaft, a high/low switching mechanism that changes a frequency of rotation of the input shaft and transmits the rotation to the output shaft, an output member that outputs motive power to a destination that is different from that of the output shaft, and a clutch that transmits a part of motive power from the output shaft to the output member or shuts off the transmission, or adjusts a torque to be transmitted to the output member are known. The transfer described in US 2007/0251345 A is one of such transfers. In the transfer for a four-wheel drive vehicle described in US 2007/0251345 A, switching operation of the high/low switching mechanism and the transmitted torque adjustment in the clutch is performed by a single motor. In the transfer in US 2007/0251345 A, as a transform mechanism that transforms rotation of the motor to linear motion, a drum cam is employed for switching operation of the high/low switching mechanism, and a ball cam and a lever are employed for transmitted torque adjustment in the clutch.

SUMMARY OF THE INVENTION

In the aforementioned transfer, a ball cam and a lever are employed for transmitted torque control in the clutch, and thus, it is necessary to provide an eccentric cam not on the output shaft, but on a fork shaft disposed in parallel to the output shaft and make a motor to drive the fork shaft to rotate, and the drum cam for switching operation of the high/low switching mechanism is also provided on the fork shaft. However, in the aforementioned transfer, in order to obtain a predetermined transmitted torque in the clutch, it is necessary to make a length of the lever provided between the output shaft and the fork shaft have a predetermined value or more and prevent the drum cam provided on the fork shaft, and the high/low switching mechanism provided on the output shaft and the clutch from interfering with each other, and thus, a distance between the output shaft and the fork shaft is relatively long, which may result in the transfer being large in size.

The present invention provides a transfer having a small distance between an output shaft and a fork shaft compared to the conventional techniques, enabling downsizing.

A transfer for a vehicle according to an aspect of the present invention includes: an input shaft; an output shaft arranged on a common axis that is in common with the input shaft; a high/low switching mechanism that changes a speed of rotation of the input shaft and transmits the rotation to the output shaft; an output member that outputs motive power to a destination that is different from that of the output shaft; a clutch that transmits a part of motive power from the output shaft to the output member or shuts off the transmission, or adjusts a transmitted torque to be transmitted to the output member; a motor; a ball cam including a first annular member, and a second annular member positioned on the clutch side, the first annular member and the second annular member being each supported on the output shaft so as to be rotatable relative to the output shaft, including respective inclined recess grooves formed in surfaces facing each other and being prevented from moving in the common axis direction, and a spherical rolling element housed in the inclined recess grooves of the first annular member and the second annular member, either of the first annular member and the second annular member being driven to rotate around the common axis by the motor to move the second annular member to the clutch side; a transmission mechanism that transmits movement in the common axis direction of the second annular member to the clutch; a fork shaft disposed in parallel to the common axis and supported so as to be movable in an axis direction; a cam engagement member connected to the fork shaft; a drum cam including a cam groove formed in an outer peripheral portion, the cam groove engaging with the cam engagement member, being connected to either of the first annular member and the second annular member and pivoting around the common axis to move the cam engagement member to the axis direction of the fork shaft; and a fork connected to the fork shaft, the fork transmitting movement in the axis direction of the fork shaft to the high/low switching mechanism that switches between a high gear and a low gear.

According to the above aspect, upon either of the first annular member and the second annular member being driven to rotate by the motor, the second annular member moves to the clutch side and linear motion of the second annular member is transmitted to the clutch via the transmission mechanism. Also, upon either of the first annular member and the second annular member being driven to rotate by the motor, the drum cam connected to either of the first annular member and the second annular member pivots and the cam engagement member engaging with the cam groove moves in the axis direction of the fork shaft, whereby linear motion of the cam engagement member is transmitted to the high/low switching mechanism via the fork. Consequently, in order to perform switching operation of the high/low switching mechanism, the drum cam is connected to either of the first annular member and the second annular member of the ball cam provided on the output shaft, eliminating the need to provide the drum cam on the fork shaft as opposed to the conventional techniques and thus favorably enabling decrease in distance between the output shaft and the fork shaft and downsizing of the transfer. Furthermore, linear motion of the second annular member in the ball cam provided on the output shaft is transmitted to the clutch via the transmission mechanism, eliminating the need to provide, for example, a ball cam and a lever for adjustment of transmitted torque in the clutch, and thus favorably enabling decrease in distance between the output shaft and the fork shaft and downsizing of the transfer.

In the above aspect, an output shaft support bearing that rotatably supports an end portion on the drum cam side of the output shaft may be disposed inside the drum cam so as to overlap with a range of a length in the common axis direction of the drum cam.

Also, in the above configuration, the output shaft support bearing that rotatably supports the end portion on the drum cam side from among the opposite end portions of the output shaft is disposed inside the drum cam so as to overlap with the range of the length in the common axis direction of the drum cam, and thus, a dimension in the axis direction of the output shaft of the transfer is favorably decreased.

In the above aspect, the cam groove formed in the drum cam may include an inclined cam groove extending in a direction inclined relative to the common axis, and when the drum cam is made to pivot around the common axis by the motor, the cam engagement member may be moved in the axis direction of the fork shaft along the inclined cam groove of the drum cam by a movement amount that is larger than an amount of movement in the common axis direction of the second annular member.

Also, according to the above configuration, the cam groove formed in the drum cam includes the inclined cam groove extending in the direction inclined relative to the common axis, and when the drum cam is made to pivot around the common axis by the motor, the cam engagement member is moved in the axis direction of the fork shaft along the inclined cam groove of the drum cam by a movement amount that is larger than an amount of movement in the common axis direction of the second annular member. Thus, responsiveness to switching between the high gear and the low gear in the high/low switching mechanism is substantially enhanced compared to, for example, those that switch between the high gear and the low gear by means of movement in the common axis direction of the second annular member in the ball cam.

In the above aspect, the cam engagement member may transmit movement in the common axis direction of the cam engagement member to the fork shaft via a spring member.

Also, according to the above configuration, the cam engagement member transmits movement in the common axis direction of the cam engagement member to the fork shaft via the spring member. Thus, in switching between the high gear and the low gear in the high/low switching mechanism, an impact resulting from switching via the high/low switching mechanism is absorbed by the spring member.

In the above aspect, the clutch may be a clutch that adjusts a torque to be transmitted to the output member, and may be a single-plate or multi-plate clutch.

Also, according to the aforementioned configuration, the clutch is a clutch that adjusts a torque to be transmitted to the output member, and the clutch is a single-plate or multi-plate clutch. Thus, continuous variable control of transmitted torque by the clutch is possible, enabling enhanced control of driving force distribution to front wheels and rear wheels according to a driving status.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the present invention will be described in detail below with the drawings. In the below embodiment, the drawings are arbitrarily simplified or deformed, and, e.g., dimensional ratios among respective parts and shapes of the respective parts are not always indicated accurately.

Figure 1:
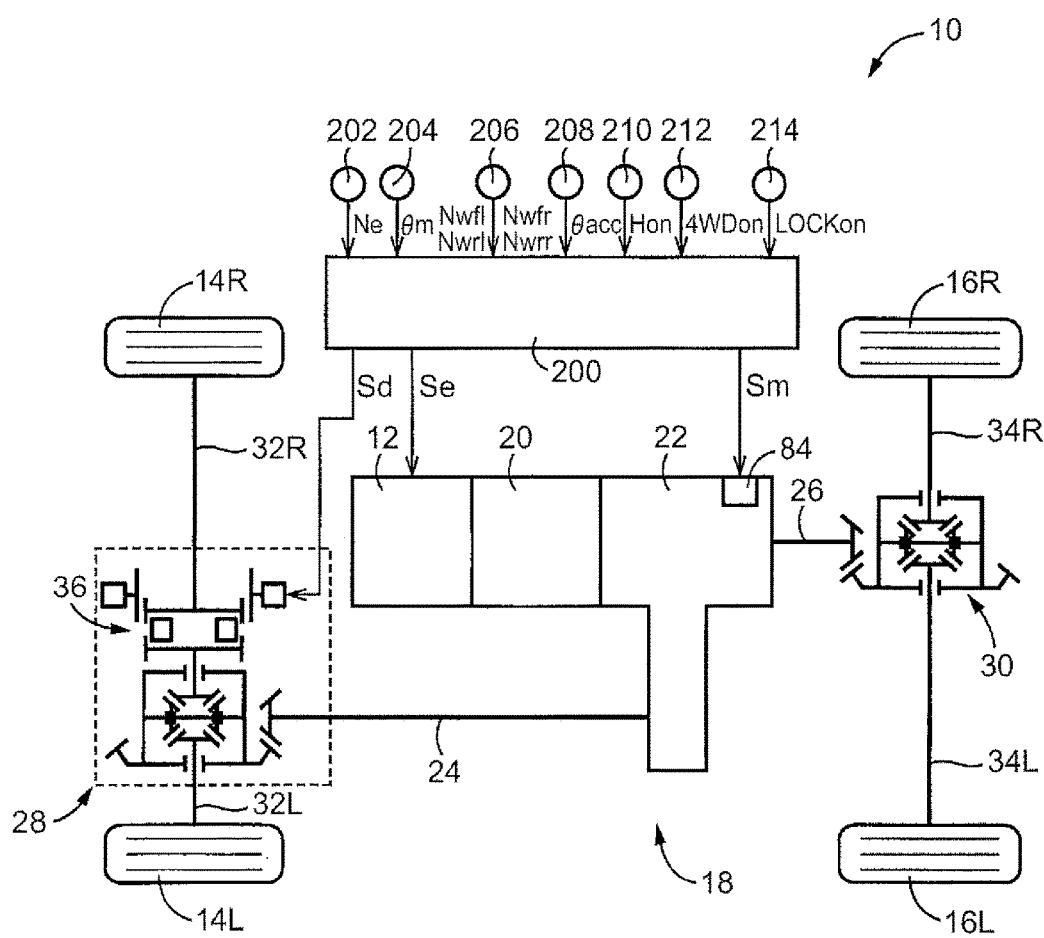
FIG. 1 is a diagram illustrating a schematic configuration of a vehicle in which the present invention is employed and is also a diagram illustrating a major part of a control system for various control in the vehicle.

FIG. 1 is a diagram illustrating a schematic configuration of a vehicle 10 in which the present invention is employed and also is a diagram illustrating a major part of a control system for various control in the vehicle 10. In FIG. 1, a vehicle 10 includes, e.g., an engine 12, which is a driving force source, left and right front wheels 14L, 14R (referred to front wheels 14 where the front wheels 14L, 14R are not specifically distinguished from each other), left and right rear wheels 16L, 16R (referred to rear wheels 16 where the rear wheels 16L, 16R are not specifically distinguished from each other), and a motive power transmission system 18 that transmits motive power of the engine 12 to the front wheels 14 and the rear wheels 16, respectively. The rear wheels 16 are main drive wheels, which serve as drive wheels in 2-wheel drive (2WD) running and four-wheel drive (4WD) running. The front wheels 14 are auxiliary drive wheels, which serve as driven wheels in 2WD running and serves as drive wheels in 4WD running. The vehicle 10 is a four-wheel drive vehicle of a front-engine, rear wheel-drive (FR) type.

The motive power transmission system 18 includes, e.g., a transmission 20 connected to the engine 12, a transfer 22 for a four-wheel drive vehicle (transfer for a vehicle), the transfer 22 being connected to the transmission 20 and being a front/rear wheel motive power distribution device, a front propeller shaft 24 and a rear propeller shaft 26 each connected to the transfer 22, a front-wheel differential gear unit 28 connected to the front propeller shaft 24, a rear-wheel differential gear unit 30 connected to the rear propeller shaft 26, left and right front wheel axles 32L, 32R (referred to as "front wheel axles 32" where the front wheel axles 32L, 32R are not specifically distinguished from each other) connected to the front-wheel differential gear unit 28, and left and right rear wheel axles 34L, 34R (referred to as "rear wheel axles 34" where the rear wheel axles 34L, 34R are not specifically distinguished from each other) connected to the rear-wheel differential gear unit 30. In the motive power transmission system 18 configured as described above, motive power transmitted from the engine 12 to the transfer 22 via the transmission 20 is transmitted from the transfer 22 to the rear wheels 16 through a rear wheel-side motive power transmission path including, e.g., the rear propeller shaft 26, the rear-wheel differential gear unit 30 and the rear wheel axles 34 sequentially. Also, a part of motive power transmitted from the engine 12 to the rear wheel 16 side is distributed to the front wheel 14 side by the transfer 22 and is transmitted to the front wheels 14 through a front wheel-side motive power transmission path including, e.g., the front propeller shaft 24, the front-wheel differential gear unit 28 and the front wheel axle 32 sequentially.

The front-wheel differential gear unit 28 includes a front-side clutch 36 on the front wheel axle 32R side (that is, between the front-wheel differential gear unit 28 and the front wheel 14R). The front-side clutch 36 is an electrically (electromagnetically)-controlled mesh clutch that selectively connects or disconnects a motive power transmission path between the front-wheel differential gear unit 28 and the front wheel 14R. The front-side clutch 36 may further include a synchronization mechanism.

Figure 2:
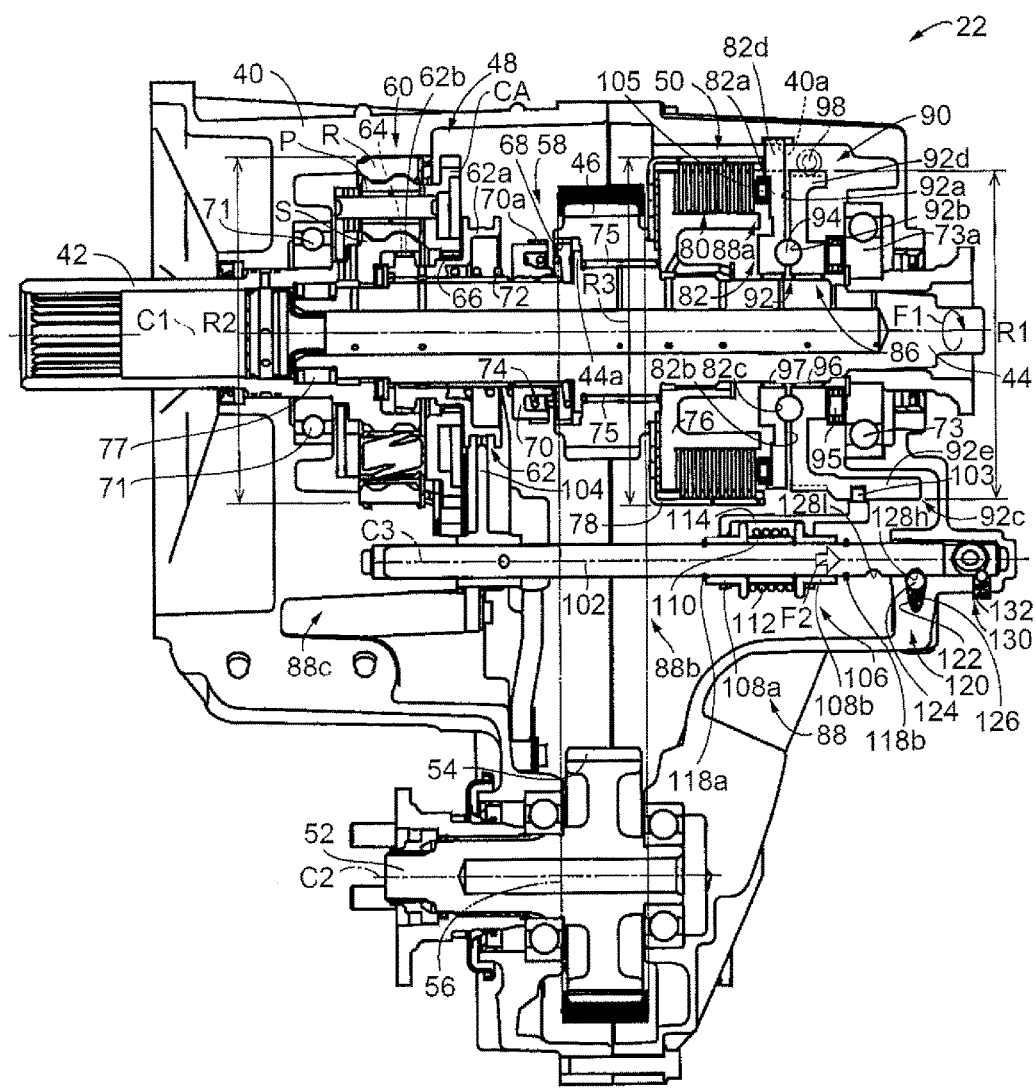
FIG. 2 is a sectional view of a schematic configuration of a transfer and is also a diagram illustrating a mode for providing a 4WD running state in a high gear.
Figure 3:
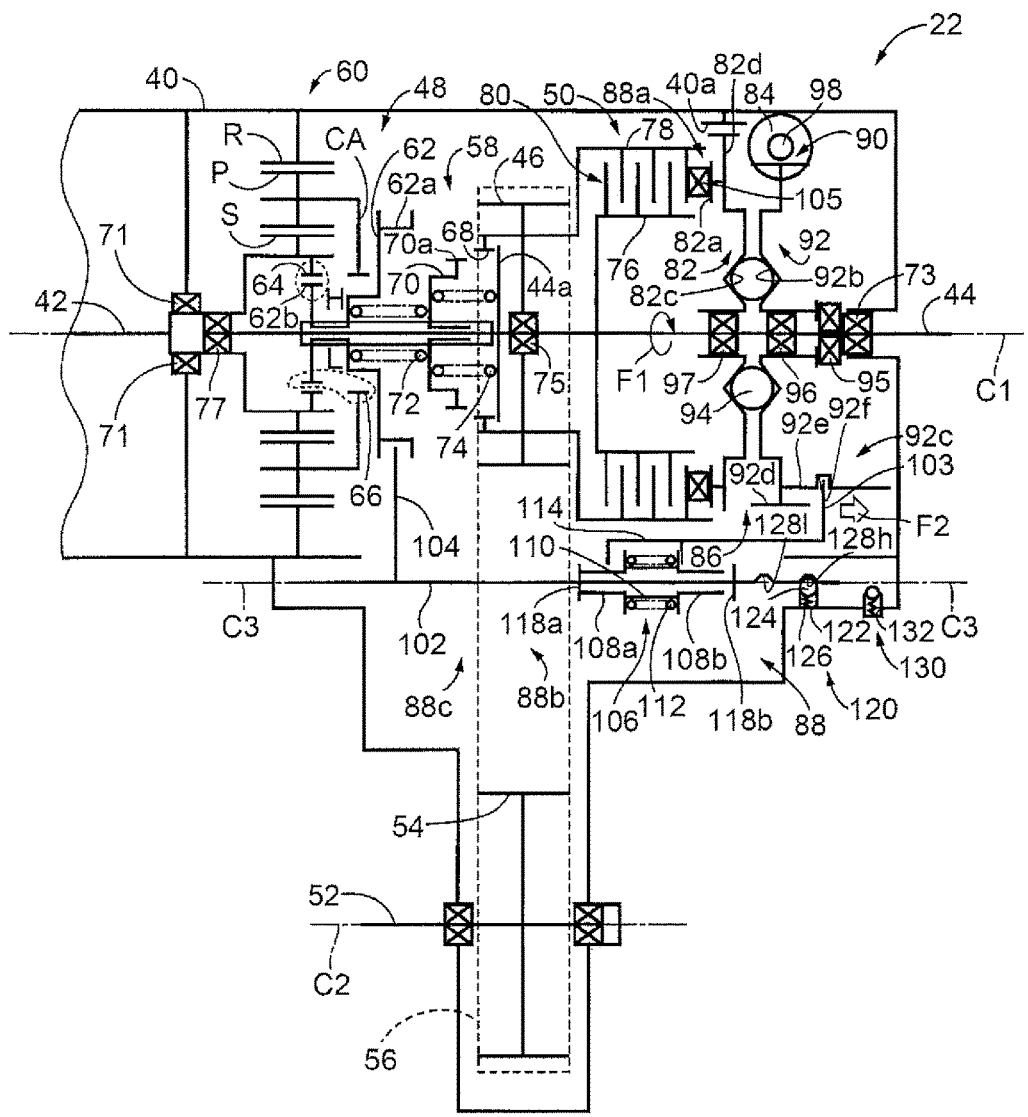
FIG. 3 is a skeleton diagram illustrating a schematic configuration of the transfer.
Figure 4:
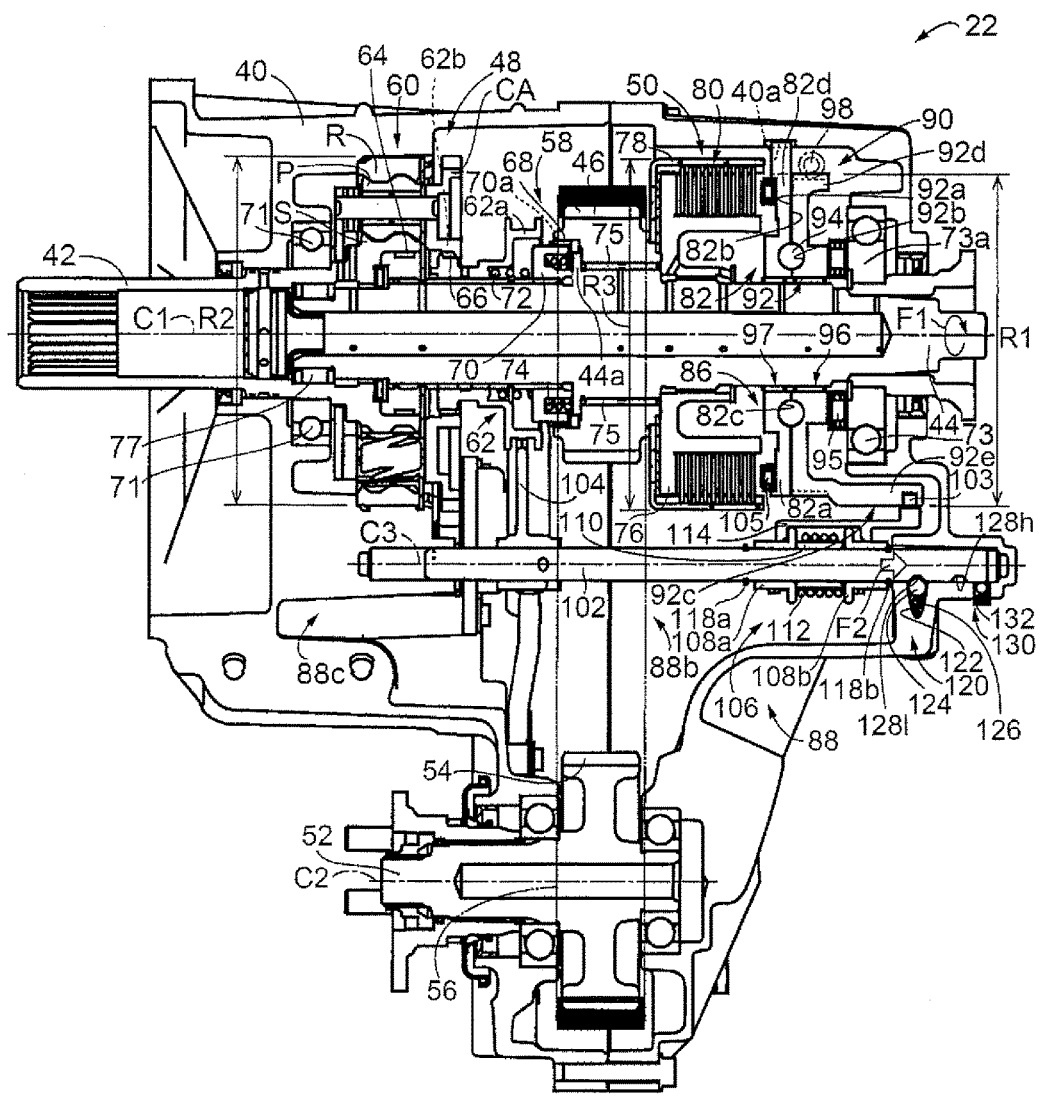
FIG. 4 is a sectional view illustrating a schematic configuration of the transfer and is also a diagram illustrating a mode for providing a 4WD running state in a 4WD locking state in a low gear.

FIGS. 2 to 4 are diagrams illustrating a schematic configuration of the transfer 22: FIGS. 2 and 4 are sectional views of the transfer 22; and FIG. 3 is a skeleton diagram of the transfer 22. In FIGS. 2 to 4, the transfer 22 includes a transfer case 40, which is a non-rotary member. The transfer 22 includes an input shaft 42 rotatably supported by the transfer case 40 and a rear wheel-side output shaft (output shaft) 44 that outputs motive power to the rear wheels 16, which are first left and right drive wheels, a sprocket drive gear (output member) 46 that outputs motive power to the front wheels 14, which are second left and right drive wheels, that is, outputs motive power to a destination that is different from that of the rear wheel-side output shaft 44, a high/low switching mechanism 48, which is an auxiliary transmission that changes a speed of rotation of the input shaft 42 and transmits the rotation to the rear wheel-side output shaft 44, and a front wheel-driving clutch (clutch) 50 as a multi-plate wet clutch that adjusts a transmitted torque to be transmitted from the rear wheel-side output shaft 44 to the drive gear 46, that is, transmits a part of motive power of the rear wheel-side output shaft 44 to the drive gear 46, on a common first axis line (common axis) C1. The input shaft 42 and the rear wheel-side output shaft 44 are coaxial to each other and are rotatably supported by the transfer case 40 via a pair of a first support bearing 71 and a second support bearing (output shaft support bearing) 73, respectively, and the drive gear 46 is supported via a third support bearing 75 so as to be coaxial to and rotatable relative to the rear wheel-side output shaft 44. In other words, the input shaft 42, the rear wheel-side output shaft 44 and the drive gear 46 are each supported by the transfer case 40 so as to be rotatable around the common first axis line C1. In other words, the input shaft 42, the rear wheel-side output shaft 44 and the drive gear 46 are arranged on the common first axis line C1. In the rear wheel-side output shaft 44, a front-side end portion of the rear wheel-side output shaft 44 is rotatably supported by a bearing 77 disposed between a rear-side end portion of the input shaft 42 and the front-side end portion of the rear wheel-side output shaft 44, and a rear-side end portion of the rear wheel-side output shaft 44, that is, an end portion on the later-described drum cam portion (drum cam) 92c side from among opposite end portions of the rear wheel-side output shaft 44 is rotatably supported by the second support bearing 73.

As illustrated in FIGS. 2 to 4, the transfer 22 includes a front wheel-side output shaft 52, and a sprocket driven gear 54 provided integrally with the front wheel-side output shaft 52 on a common second axis line C2 that is parallel to the first axis line C1 inside the transfer case 40. Furthermore, the transfer 22 includes a front wheel-driving chain 56 looped around the drive gear 46 and the driven gear 54, and a 4WD locking mechanism 58, which is a dog clutch that connects the rear wheel-side output shaft 44 and the drive gear 46 to each other in an integrated manner.

The input shaft 42 is connected to an output shaft (not illustrated) of the transmission 20 via a joint, and is driven to rotate by a driving force (torque) input from the engine 12 via the transmission 20. The rear wheel-side output shaft 44 is a main drive shaft connected to the rear propeller shaft 26. The drive gear 46 is provided around the rear wheel-side output shaft 44 so as to be rotatable relative to the wheel-side output shaft 44. The front wheel-side output shaft 52 is an auxiliary drive shaft connected to the front propeller shaft 24 via a non-illustrated joint.

The transfer 22 configured as described above adjusts a transmitted torque to be transmitted to the drive gear 46 by means of the front wheel-driving clutch 50, and transmits motive power transmitted from the transmission 20, only to the rear wheel 16 or distributes the motive power also to the front wheel 14. Also, the transfer 22 switches between a 4WD locked state in which occurrence of a difference in rotation between the rear propeller shaft 26 and the front propeller shaft 24 is prevented by the 4WD locking mechanism 58 and a 4WD non-locked state in which occurrence of a difference in rotation between the rear propeller shaft 26 and the front propeller shaft 24 is allowed. Also, the transfer 22 provides either of a shift into a high gear H and a shift into a low gear L to change a speed of rotation from the transmission 20 and transmits the rotation to the subsequent stage. In other words, in the transfer 22, rotation of the input shaft 42 is transmitted to the rear wheel-side output shaft 44 via the high/low switching mechanism 48, and where torque transmitted via the front wheel-driving clutch 50 is zero and the 4WD locking mechanism 58 is released, no motive power is transmitted from the rear wheel-side output shaft 44 to the front wheel-side output shaft 52, and where torque is transmitted via the front wheel-driving clutch 50 or the 4WD locking mechanism 58 is in engagement, motive power is transmitted from the rear wheel-side output shaft 44 to the front wheel-side output shaft 52 via the drive gear 46, the front wheel-driving chain 56 and the driven gear 54.

More specifically, the high/low switching mechanism 48 includes a single-pinion planetary gear unit 60 and a high/low sleeve 62. The planetary gear unit 60 includes a sun gear S connected to the input shaft 42 so as to be unrotatable around the first axis line C1, a ring gear R disposed substantially concentrically with the sun gear S and connected to the transfer case 40 so as to be unrotatable around the first axis line C1, and a carrier CA that supports a plurality of pinion gears P engaging with the sun gear S and the ring gear R so as to be able to spin or revolve around the sun gear S. Thus, a rotation speed of the sun gear S is equal to that of the input shaft 42, and a rotation speed of the carrier CA is decreased relative to that of the input shaft 42. Also, high-side gear teeth 64 are fixedly provided at an inner peripheral face of the sun gear S, and low-side gear teeth 66 having a diameter that is equal to that of the high-side gear teeth 64 are fixedly provided in the carrier CA. The high-side gear teeth 64 are spline teeth that output a rotation having a speed that is equal to that of the input shaft 42, and are involved in a shift to the high gear H. The low-side gear teeth 66 are spline teeth that output a rotation having a speed that is lower than that of the high-side gear teeth 64 and are involved in a shift to the low gear L. The high/low sleeve 62 is spline-fitted to the rear wheel-side output shaft 44 so as to be movable relative to the rear wheel-side output shaft 44 in a direction parallel to the first axis line C1, and includes a fork connecting portion 62a and outer peripheral teeth 62b that are provided integrally with and adjacent to the fork connecting portion 62a and engage with the high-side gear teeth 64 and the low-side gear teeth 66, respectively, by means of movement in the direction parallel to the first axis line C1 of the rear wheel-side output shaft 44. Upon the high-side gear teeth 64 and the outer peripheral teeth 62b engaging with each other, rotation having a speed that is equal to that of the input shaft 42 is transmitted to the rear wheel-side output shaft 44, and upon the low-side gear teeth 66 and the outer peripheral teeth 62b engaging with each other, rotation having a speed decreased relative to that of rotation of the input shaft 42 is transmitted to the rear wheel-side output shaft 44. The high-side gear teeth 64 and the high/low sleeve 62 function as a high gear clutch that provides a shift to the high gear H, and the low-side gear teeth 66 and the high/low sleeve 62 function as a low gear clutch that provides a shift to the low gear L.

The 4WD locking mechanism 58 includes locking teeth 68 fixedly provided at an inner peripheral face of the drive gear 46, and a locking sleeve 70 that is spline-fitted to the rear wheel-side output shaft 44 so as to be movable in the first axis line C1 direction and unrotatable relative to the rear wheel-side output shaft 44, the locking sleeve 70 including outer peripheral teeth 70a fixedly provided at an outer peripheral face, the outer peripheral teeth 70a engaging with the locking teeth 68 formed at the drive gear 46 upon movement in the first axis line C1 direction. In the transfer 22, in an engaged state of the 4WD locking mechanism 58 in which the outer peripheral teeth 70a of the locking sleeve 70 and the locking teeth 68 engage with each other, the rear wheel-side output shaft 44 and the drive gear 46 are rotated integrally, providing a 4WD locked state.

The high/low sleeve 62 is provided in a space on the drive gear 46 side relative to the first support bearing 71 provided on the input shaft 42 (more specifically, relative to the planetary gear unit 60). The locking sleeve 70 is provided so as to be adjacent to but separate from the high/low sleeve 62, in a space between the high/low switching mechanism 48 and the drive gear 46. The transfer 22 includes a pre-compressed first spring 72 that are in abutment with the high/low sleeve 62 and the locking sleeve 70 and biases the high/low sleeve 62 and the locking sleeve 70 to the respective sides that are away from each other, between the high/low sleeve 62 and the locking sleeve 70. The transfer 22 includes a pre-compressed second spring 74 that are in abutment with a projection portion 44a of the rear wheel-side output shaft 44 and the locking sleeve 70 and biases the locking sleeve 70 to the side that is away from the locking teeth 68, between the drive gear 46 and the locking sleeve 70. A biasing force of the first spring 72 is set to be larger than that of the second spring 74. The projection portion 44a is a brim portion of the rear wheel-side output shaft 44, the brim portion being provided so as to project to the locking teeth 68 side in a space on the inner side in a radial direction of the drive gear 46. The high-side gear teeth 64 are provided at a position at which the high-side gear teeth 64 are away from the locking sleeve 70 relative to the low-side gear teeth 66 as viewed in the direction parallel to the first axis line C1. The outer peripheral teeth 62b of the high/low sleeve 62 engage with the high-side gear teeth 64 on the side on which the high/low sleeve 62 is away from the locking sleeve 70 (left side in FIGS. 2 and 3), and engage with the low-side gear teeth 66 on the side on which the high/low sleeve 62 is close to the locking sleeve 70 (right side in FIGS. 2 and 3). The outer peripheral teeth 70a of the locking sleeve 70 engage with the locking teeth 68 on the side on which the locking sleeve 70 is close to the drive gear 46 (right side in FIGS. 2 and 3). Therefore, the outer peripheral teeth 70a of the locking sleeve 70 engage with the locking teeth 68 in a position in which the high/low sleeve 62 engages with the low-side gear teeth 66.

The front wheel-driving clutch 50 includes a multi-plate friction clutch including a clutch hub 76 connected to the rear wheel-side output shaft 44 so as to be unrotatable relative to the rear wheel-side output shaft 44, a clutch drum 78 connected to the drive gear 46 so as to be unrotatable relative to the drive gear 46, a frictional engagement element 80 interposed between the clutch hub 76 and the clutch drum 78, the frictional engagement element 80 selectively connecting/disconnecting the clutch hub 76 and the clutch drum 78, and a pushing portion 82a of a second annular member 82 described later, the pushing portion 82a pushing the frictional engagement element 80. The front wheel-driving clutch 50 is disposed on the first axis line C1 of the rear wheel-side output shaft 44 on the side opposite to the high/low switching mechanism 48 relative to the drive gear 46 in the first axis line C1 direction of the rear wheel-side output shaft 44, and the frictional engagement element 80 is pressed against the front wheel-driving clutch 50 by the pushing portion 82a of the second annular member 82 moving to the drive gear 46 side. Where the pushing portion 82a of the second annular member 82 moves to the non-pushing side (right side in FIGS. 2 and 3), which is the side that is away from the drive gear 46 in the direction parallel to the first axis line C1 and is thus not in abutment with the frictional engagement element 80, the front wheel-driving clutch 50 is in a released state. On the other hand, where the pushing portion 82a of the second annular member 82 moves to the pushing side (left side in FIGS. 2 and 3), which is the side that is close to the drive gear 46 in the direction parallel to the first axis line C1 and the pushing portion 82a is thus in abutment with the frictional engagement element 80, the front wheel-driving clutch 50 adjusts a transmitted torque (torque capacity) according to the amount of movement of the second annular member 82 and is thereby brought into a released state, a slipping state or an engagement state.

In a released state of the front wheel-driving clutch 50 and a released state of the 4WD locking mechanism 58 in which the outer peripheral teeth 70a of the locking sleeve 70 and the locking teeth 68 do not engage with each other, a motive power transmission path between the rear wheel-side output shaft 44 and the drive gear 46 is shut off and the transfer 22 transmits motive power transmitted from the transmission 20, only to the rear wheels 16. In a slipping state or an engagement stage of the front wheel-driving clutch 50, the transfer 22 distributes motive power transmitted from the transmission 20, to the front wheels 14 and the rear wheels 16. In the transfer 22, in a slipping state of the front wheel-driving clutch 50, a difference in rotation between the rear wheel-side output shaft 44 and the drive gear 46 is allowed and a differential state (4WD non-locked state) is provided. In the transfer 22, in an engagement state of the front wheel-driving clutch 50, the rear wheel-side output shaft 44 and the drive gear 46 are rotated integrally and a 4WD locked state is provided. The front wheel-driving clutch 50 can continuously change torque distribution between the front wheels 14 and the rear wheels 16 in a range of, for example, 0:100 to 50:50 by means of transmitted torque control.

The transfer 22 further includes an electric motor (motor) 84 (see FIG. 3), a ball cam 86 that transforms rotational motion of the electric motor 84 to linear motion, and a transmission mechanism 88 that transmits rotational motion power of the electric motor 84 to each of the high/low switching mechanism 48, the front wheel-driving clutch 50 and the 4WD locking mechanism 58 via the ball cam 86, as devices that actuate the high/low switching mechanism 48, the front wheel-driving clutch 50 and the 4WD locking mechanism 58.

The ball cam 86 is supported on the rear wheel-side output shaft 44 on the side opposite to the drive gear 46 relative to the front wheel-driving clutch 50. Also, the ball cam 86 includes a first annular member 92 and a second annular member 82 including inclined recess grooves 92b, 82c formed in respective surfaces 92a, 82b facing each other, and a spherical rolling element 94 housed in the inclined recess grooves 92b, 82c of the first annular member 92 and the second annular member 82, that is, sandwiched between the inclined recess grooves 92b, 82c. Here, the second annular member 82 includes an engagement portion 82d that engages with engagement teeth 40a formed at a part of the transfer case 40, which is a non-rotary member, and the engagement portion 82d and the engagement teeth 40a make the second annular member 82 to be supported on the rear wheel-side output shaft 44 so as to be unpivotable around the first axis line C1 of the rear wheel-side output shaft 44 and be movable in the first axis line C1 direction of the rear wheel-side output shaft 44. A second bearing 97 is interposed between the second annular member 82 and the rear wheel-side output shaft 44, and the second annular member 82 is supported by the second bearing 97 so as to be rotatable relative to the rear wheel-side output shaft 44. Also, the first annular member 92 is connected indirectly to the electric motor 84 via a worm drive 90 included in the transfer 22, and the first annular member 92 is in abutment with a thrust bearing 95 that is adjacent to an inner race 73a of the second support bearing 73. A first bearing 96 is interposed between the first annular member 92 and the rear wheel-side output shaft 44, and the first annular member 92 is supported by the first bearing 96 so as to be rotatable relative to the rear wheel-side output shaft 44. The first annular member 92 is supported by the thrust bearing 95, the first bearing 96 and the second annular member 82 so as to be pivotable around the first axis line C1 of the rear wheel-side output shaft 44 and be unmovable in the first axis line C1 direction of the rear wheel-side output shaft 44. Also, in the ball cam 86, the second annular member 82 is disposed on the front wheel-driving clutch 50 side, that is, the frictional engagement element 80 side, and the first annular member 92 is disposed on the side opposite to the front wheel-driving clutch 50 side. Also, the inclined recess grooves 92b, 82c formed in the surfaces 92a, 82b facing each other are formed in a plurality of sites in the first annular member 92 and the second annular member 82 at intervals of a same angle in a circumferential direction, and depths of the inclined recess grooves 92b, 82c continuously vary through the positions of the inclined recess grooves 92b, 82c in the circumferential direction.

In the ball cam 86 configured as described above, upon the first annular member 92 being driven to rotate around the first axis line C1 by the electric motor 84 and the first annular member 92 and the second annular member 82 pivoting relative to each other, the second annular member 82 is moved away from the first annular member 92 or the second annular member 82 is moved close to the first annular member 92, and thus, the second annular member 82 is moved in the first axis line C1 direction of the rear wheel-side output shaft 44. Here, in the present embodiment, as illustrated in FIGS. 2 to 5, upon the first annular member 92 being made to pivot around the first axis line C1 in the arrow F1 direction by the electric motor 84, the second annular member 82 moves in a direction away from the frictional engagement element 80 of the front wheel-driving clutch 50, that is, the arrow F2 direction in the first axis line direction C1. Also, upon the first annular member 92 being made to pivot around the first axis line C1 in a direction opposite to the arrow F1 direction by the electric motor 84, the second annular member 82 moves in a direction close to the frictional engagement element 80 of the front wheel-driving clutch 50, that is, in a direction opposite to the arrow F2 direction in the first axis line direction C1.

The worm drive 90 is a gear pair including a worm 98 formed integrally with a motor shaft of the electric motor 84, and a worm wheel 92d provided at a drum cam portion (drum cam) 92c provided at an outer peripheral portion of the first annular member 92. For example, rotation of the electric motor 84 such as a brushless motor is decelerated and transmitted to the first annular member 92 via the worm drive 90. The ball cam 86 transforms the rotation of the electric motor 84 transmitted to the first annular member 92 into linear motion of the second annular member 82.

The transmission mechanism 88 includes a first transmission mechanism (transmission mechanism) 88a that transmits linear motion of the second annular member 82 in the ball cam 86, that is, movement in the first axis line C1 direction of the second annular member 82 to the front wheel-driving clutch 50, and a second transmission mechanism 88b that transits movement in the first axis line C1 direction of a later-described cam engagement member 103 engaging with a cam groove 92f formed in the drum cam portion 92c of the first annular member 92 to the high/low switching mechanism 48.

Figure 5:
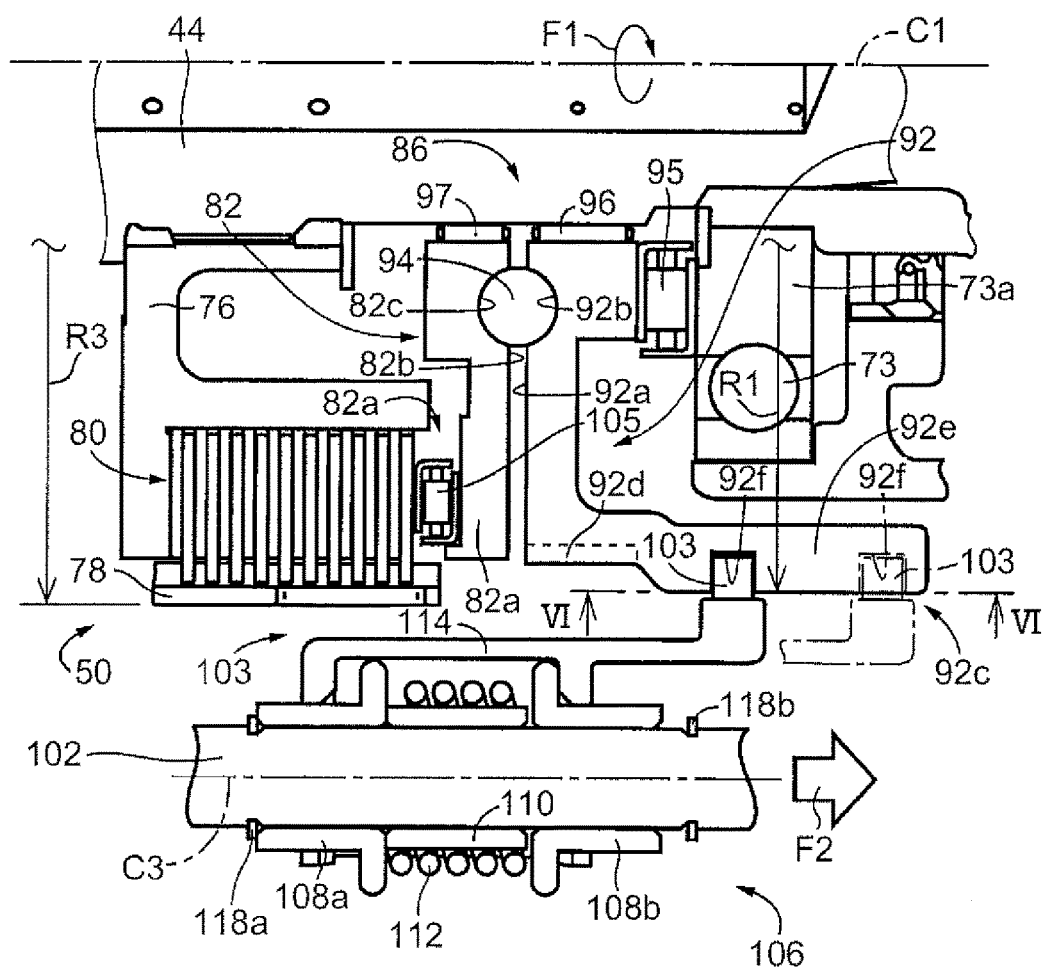
FIG. 5 is an enlarged view of FIG. 2, which illustrates a drum cam provided in the transfer.

As illustrated in FIGS. 2 and 5, the drum cam portion 92c forming at the first annular member 92 includes the circular worm wheel 92d engaging with the worm 98 formed at the motor shaft of the electric motor 84, a protrusion portion 92e that protrudes in a direction close to the rear propeller shaft 26 from the worm wheel 92d at an end portion on the fork shaft (fork shaft) 102 side of the worm wheel 92d, and a cam groove 92f formed in an outer peripheral portion of the protrusion portion 92e. Here, the protrusion portion 92e has a shape indicating, for example, a part of a cylindrical shape formed by making a part in a circumferential direction of the worm wheel 92d protrude in a direction close to the rear propeller shaft 26. The second support bearing 73 that supports the end portion on the drum cam portion 92c side from among the opposite end portions of the rear wheel-side output shaft 44 is disposed inside the drum cam portion 92c so as to overlap with a range of a length in the first axis line C1 direction of the rear wheel-side output shaft 44 of the drum cam portion 92c. Also, the drum cam portion 92c is formed in such a manner that a dimension R1 in a radial direction of the rear wheel-side output shaft 44 of the drum cam portion 92c is not larger than a dimension R2 in the radial direction of the rear wheel-side output shaft 44 of the high/low switching mechanism 48 and a dimension R3 in the radial direction of the rear wheel-side output shaft 44 of the front wheel-driving clutch 50. The dimension R2 is an outer diameter dimension of the ring gear R or the carrier CA of the high/low switching mechanism 48. The dimension R3 is an outer diameter dimension of the clutch drum 78 of the front wheel-driving clutch 50.

Figure 6A:
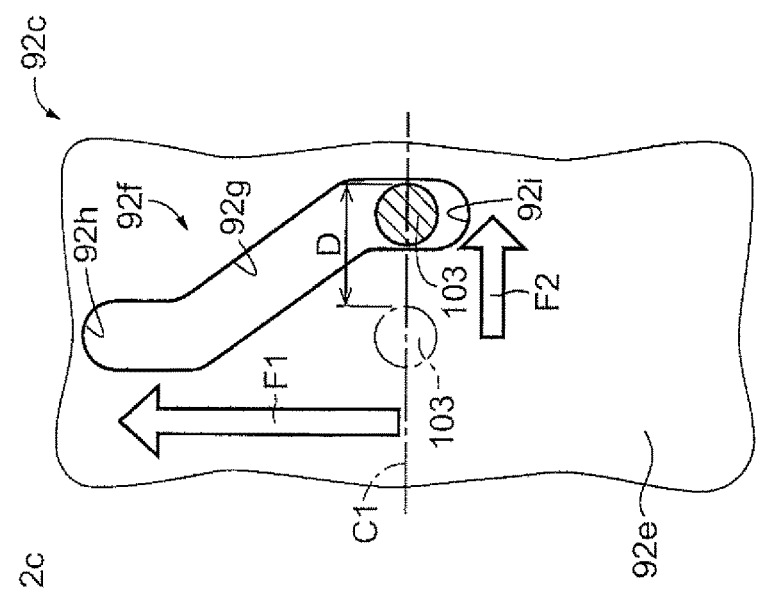
FIG. 6A is a sectional view along VI-VI in FIG. 5, and is a diagram indicating a position of a cam engagement member when a fork shaft is in a high gear position.
Figure 6B:
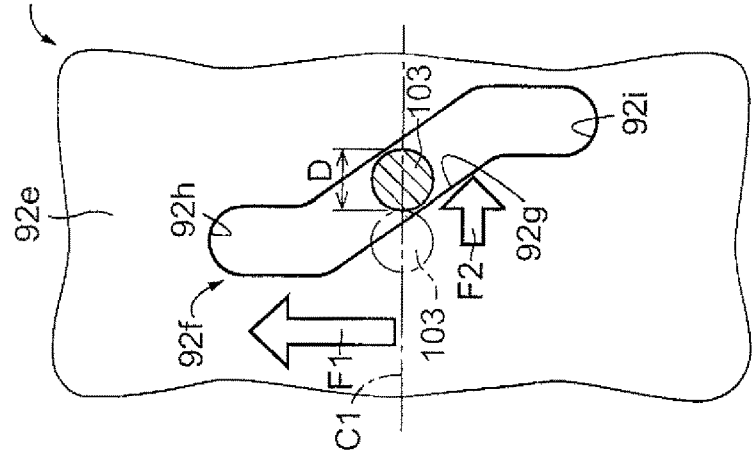
FIG. 6B is a sectional view along VI-VI in FIG. 5, and is a diagram indicating a position of the cam engagement member when the fork shaft is being shifted from the high gear position to a low gear position.
Figure 6C:
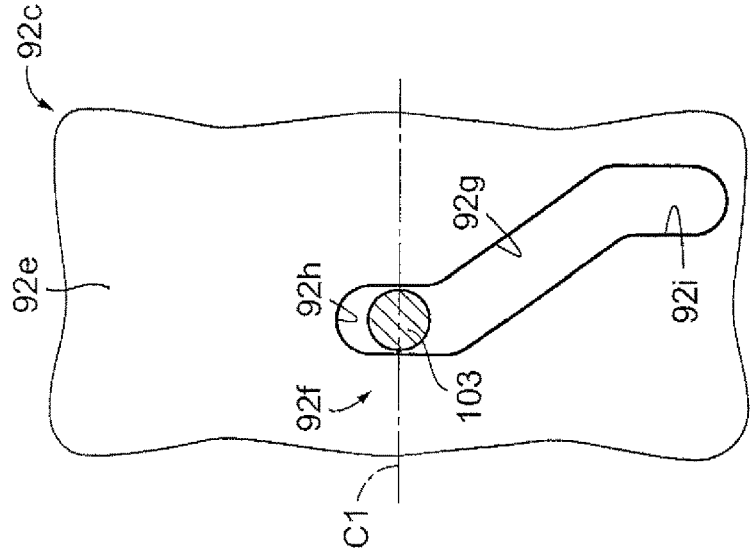
FIG. 6C is a sectional view along VI-VI in FIG. 5, and is a diagram indicating a position of the cam engagement member when the fork shaft is in the low gear position.

As illustrated in FIG. 6, the cam groove 92f formed in the drum cam portion 92c includes an inclined cam groove 92g extending in a direction inclined relative to the first axis line C1 of the rear wheel-side output shaft 44, a first cam groove 92h formed in an end portion on the ball cam 86 side of the inclined cam groove 92g, the first cam groove 92h extending in a direction perpendicular to the first axis line C1, and a second cam groove 92i formed in an end portion on the side opposite to the ball cam 86 side of the inclined cam groove 92g, the second cam groove 92i extending in a direction perpendicular to the first axis line C1. According to the drum cam portion 92c configured as described above, for example, as illustrated in FIG. 6A, upon the first annular member 92 being made to pivot around the first axis line C1 in the arrow F1 direction and the drum cam portion 92c being made to pivot around the first axis line C1 in the arrow F1 direction by the electric motor 84 from a state in which the cam engagement member 103 is disposed in the first cam groove 92h of the cam groove 92f of the drum cam portion 92c, the cam engagement member 103 is moved in the arrow F2 direction, that is, a third axis line (axis) C3 direction of the fork shaft 102 along the inclined cam groove 92g of the drum cam portion 92c by a movement amount D that is larger than an amount of movement in the arrow F2 direction of the second annular member 82, that is, an amount of movement in the arrow F2 direction of the second annular member 82 as a result of the first annular member 92 pivoting in the ball cam 86. Here, the first axis line C1 of the rear wheel-side output shaft 44, the second axis line C2 of the front wheel-side output shaft 52 and the third axis line C3 of the fork shaft 102 are parallel to one another. Also, for example, as illustrated in FIG. 6C, upon the first annular member 92 being made to pivot around the first axis line C1 in the direction opposite to the arrow F1 direction and the drum cam portion 92c being made to pivot around the first axis line C1 in the direction opposite to the arrow F1 direction by the electric motor 84 from a state in which the cam engagement member 103 is disposed in the second cam groove 92i of the cam groove 92f of the drum cam portion 92c, the cam engagement member 103 is moved in the direction opposite to the arrow F2 direction along the inclined cam groove 92g of the drum cam portion 92c by a movement amount D that is larger than an amount of movement in the direction opposite to the arrow F2 direction of the second annular member 82, that is, an amount of movement in the direction opposite to the arrow F2 direction of the second annular member 82 as a result of the first annular member 92 pivoting in the ball cam 86. In other words, upon the electric motor 84 being driven to rotate and the drum cam portion 92c of the first annular member 92 being thereby made to pivot around the first axis line C1 of the rear wheel-side output shaft 44, the cam engagement member 103 engaging with the cam groove 92f formed in the drum cam portion 92c is moved by the cam groove 92f in the third axis line C3 direction of the fork shaft 102 disposed in the transfer case 40 in parallel to the first axis line C1 of the rear wheel-side output shaft 44. Here, the alternate long and short dash line circle illustrated in each of FIGS. 6B and 6C indicates a position of the cam engagement member 103 in FIG. 6A.

As illustrated in FIGS. 2 to 5, the first transmission mechanism 88a includes the pushing portion 82a of the second annular member 82, the pushing portion 82a pushing the frictional engagement element 80 of the front wheel-driving clutch 50, and a thrust bearing 105 interposed between the pushing portion 82a and the frictional engagement element 80. Consequently, linear motion of the second annular member 82 in the ball cam 86 is transmitted to the frictional engagement element 80 of the front wheel-driving clutch 50 via the first transmission mechanism 88a.

Also, as illustrated in FIGS. 2 to 5, the second transmission mechanism 88b includes the fork shaft 102 disposed in parallel to the rear wheel-side output shaft 44 and supported so as to be movable in the third axis line C3 direction in the transfer case 40, the cam engagement member 103 being connected to the fork shaft 102, and a fork 104 connected to the fork shaft 102 and also connected to the fork connecting portion 62a of the high/low sleeve 62. Here, between the cam engagement member 103 and the fork shaft 102, a waiting mechanism 106 that transmits movement in the first axis line C1 direction, that is, the third axis line C3 direction of the cam engagement member 103 to the fork shaft 102 via a spring member 112 is provided. Thus, the second transmission mechanism 88b transmits movement in the first axis line C1 direction, that is, the third axis line C3 direction of the cam engagement member 103 to the high/low sleeve 62 of the high/low switching mechanism 48 via the waiting mechanism 106, the fork shaft 102 and the fork 104. Consequently, for example, upon the cam engagement member 103 being moved in the arrow F2 direction from the state illustrated in FIGS. 2 and 6A, the high/low sleeve 62 is moved to the drive gear 46 side, that is, a position in which the outer peripheral teeth 62b of the high/low sleeve 62 engage with the low-side gear teeth 66. Also, for example, upon the cam engagement member 103 being moved in the direction opposite to the arrow F2 direction from the state illustrated in FIGS. 4 and 6C, the high/low sleeve 62 is moved to the side that is away from the drive gear 46, that is, a position in which the outer peripheral teeth 62b of the high/low sleeve 62 engage with the high-side gear teeth 64. In other words, the second transmission mechanism 88b transmits movement in the third axis line C3 direction of the fork shaft 102 to the high/low switching mechanism 48 via the fork 104, whereby one of the high gear H and the low gear L is shifted to the other.

Also, the transmission mechanism 88 includes a third transmission mechanism 88c that transmits movement in the first axis line C1 direction of the cam engagement member 103, that is, movement in the third axis line C3 direction of the cam engagement member 103 to the 4WD locking mechanism 58. As with the second transmission mechanism 88b, the third transmission mechanism 88c includes the fork shaft 102 and the fork 104, and further includes the high/low sleeve 62 connected to the fork 104, the first spring 72 disposed in a compressed state between the high/low sleeve 62 and the locking sleeve 70, and the second spring 74 disposed in a compressed state between the locking sleeve 70 and the projection portion 44a of the rear wheel-side output shaft 44.

Thus, in third transmission mechanism 88c, as described above, upon the cam engagement member 103 being moved in the arrow F2 direction and the outer peripheral teeth 62b of the high/low sleeve 62 being thereby moved to a position at which the outer peripheral teeth 62b engage with the low-side gear teeth 66, a locking-direction thrust force toward the drive gear 46 side is exerted on the locking sleeve 70 via the first spring 72. Consequently, the outer peripheral teeth 70a of the locking sleeve 70 are moved to the drive gear 46 side against a biasing force of the second spring 74, the biasing force being set to be smaller than that of the first spring 72, and engage with the locking teeth 68 of the drive gear 46. Also, upon the cam engagement member 103 being moved in the direction opposite to the arrow F2 and the outer peripheral teeth 62b of the high/low sleeve 62 being thereby moved to a position at which the outer peripheral teeth 62b engage with the high-side gear teeth 64 from a state in which the outer peripheral teeth 62b of the high/low sleeve 62 engage with the low-side gear teeth 66, a thrust force in a 4WD locking releasing direction toward the side that is away from the drive gear 46 is exerted on the locking sleeve 70 by the second spring 74. Consequently, the outer peripheral teeth 70a of the locking sleeve 70 are moved to the side that is away from the drive gear 46 by the biasing force of the second spring 74 so as to move away from the locking teeth 68 of the drive gear 46.

As illustrated in FIG. 5, the waiting mechanism 106 includes two brimmed cylindrical members 108a, 108b disposed around the third axis line C3 so as to be slidable on the fork shaft 102 in a direction parallel to the third axis line C3, brims provided at respective one end portions of the cylindrical members 108a, 108b, the brims facing each other, a cylindrical spacer 110 interposed between the two brimmed cylindrical members 108a, 108b, a spring member 112 disposed in a pre-compressed state on the outer peripheral side of the spacer 110, and a grasping member 114 that grasps the two brimmed cylindrical members 108a, 108b so as to be slidable in the direction parallel to the third axis line C3. The grasping member 114 is in abutment with the brims of the brimmed cylindrical members 108a, 108b and thereby makes the brimmed cylindrical members 108a, 108b slide on the fork shaft 102. A distance between the brims of the brimmed cylindrical members 108a, 108b when the brims are both in abutment with the grasping member 114 is set to be longer than a length of the spacer 110. Therefore, a state in which the brims are both in abutment with the grasping member 114 is provided by a biasing force of the spring member 112. Also, the waiting mechanism 106 includes stoppers 118a, 118b that prevent the respective brimmed cylindrical members 108a, 108b from moving away from each other in a direction parallel to the third axis line C3, on an outer peripheral face of the fork shaft 102. As a result of the stoppers 118a, 118b preventing the brimmed cylindrical members 108a, 108b from moving away from each other, in the second transmission mechanism 88b and the third transmission mechanism 88c, movement in the third axis line C3 direction of the cam engagement member 103 can be transmitted to the fork shaft 102 via the waiting mechanism 106.

The outer peripheral teeth 70a of the locking sleeve 70 engage with the locking teeth 68 in a position in which the fork shaft 102 makes the outer peripheral teeth 62b of the high/low sleeve 62 engage with the low-side gear teeth 66 (hereinafter referred to as "low gear position"). The frictional engagement element 80 of the front wheel-driving clutch 50 is pressed by the pushing portion 82a of the second annular member 82 in a position in which the fork shaft 102 makes the outer peripheral teeth 62b of the high/low sleeve 62 engage with the high-side gear teeth 64 (hereinafter referred to as "high gear position"), and is not pressed by the pushing portion 82a of the second annular member 82 when the fork shaft 102 is in the low gear position. Here, FIG. 6A is a diagram indicating a position of the cam engagement member 103 when the fork shaft 102 is in the high gear position, FIG. 6C is a diagram indicating a position of the cam engagement member 103 when the fork shaft 102 is in the low gear position, and FIG. 6B is a diagram indicating a position of the cam engagement member 103 when the fork shaft 102 is being shifted from the high gear position to the low gear position.

When the fork shaft 102 is in the high gear position, the distance between the brims of the brimmed cylindrical members 108a, 108b can be varied between the distance when the brims are both in abutment with the grasping member 114 and the length of the spacer 110. Therefore, the waiting mechanism 106 allows movement of the second annular member 82 in the direction parallel to the first axis line C1 between the position in which the frictional engagement element 80 of the front wheel-driving clutch 50 is pressed by the pushing portion 82a of the second annular member 82 and the position in which the frictional engagement element 80 of the front wheel-driving clutch 50 is not pressed by the pushing portion 82a of the second annular member 82, with the fork shaft 102 kept in the high gear position.

The transfer 22 includes a gear position holding mechanism 120 that holds the fork shaft 102 in the high gear position or holds the fork shaft 102 in the low gear position. The gear position holding mechanism 120 includes a receiving hole 122 formed in an inner peripheral face of the transfer case 40 on which the fork shaft 102 slides, a locking ball 124 received in the receiving hole 122, a locking spring 126 that is received in the receiving hole 122 and biases the locking ball 124 to the fork shaft 102 side, and a recess portion 128h formed in an outer peripheral face of the fork shaft 102, the recess portion 128h receiving a part of the locking ball 124 when the fork shaft 102 is in the high gear position and a recess portion 128l that receives the part of the locking ball 124 when the fork shaft 102 is in the low gear position. Even if an output from the electric motor 84 is stopped in either of the gear positions, the gear position holding mechanism 120 holds the fork shaft 102 in the gear position.

The transfer 22 includes a low gear position detection switch 130 that detects that the fork shaft 102 is in the low gear position. The low gear position detection switch 130 is, for example, a ball-shaped contact switch. The low gear position detection switch 130 is fixedly provided in a through-hole 132 formed at a position at which the low gear position detection switch 130 is in contact with the fork shaft 102 moved to the low gear position in the transfer case 40. Upon the low gear position detection switch 130 detecting that the fork shaft 102 is in the low gear position, for example, an indicator for informing a driver of a 4WD locked state in the low gear L lights up.

Referring back to FIG. 1, the vehicle 10 includes an electronic control unit (ECU) 200 including, for example, a control unit for the vehicle 10, the control unit switching between a 2WD state and a 4WD state. The electronic control unit 200 includes what is called a microcomputer including, for example, a CPU, a RAM, a ROM and an input/output interface, and the CPU performs various control of the vehicle 10 by performing signal processing using a temporary storage function of the RAM according to a program stored in the ROM in advance. For example, the electronic control unit 200 performs, e.g., output control of the engine 12 and control of the vehicle 10 driving state switching, and as necessary, is configured to include separate bodies for, e.g., engine control and the driving state control. As illustrated in FIG. 1, various actual values (for example, an engine rotation speed Ne, a motor rotation angle θm, respective wheel speeds Nwfl, Nwfr, Nwrl, Nwrr of the front wheels 14L, 14R and the rear wheels 16L, 16R, an accelerator position θacc, an H range request Hon, which is a signal indicating that an H range selection switch 210 has been operated, a 4WD request 4WDon, which is a signal indicating that a 4WD selection switch 212 has been operated, and LOCKon, which is a signal indicating that a 4WD locking selection switch 214 has been operated), which are based on detection signals from various sensors included in the vehicle 10 (for example, an engine rotation speed sensor 202, a motor rotation angle sensor 204, respective wheel speed sensors 206, an accelerator position sensor 208, the H range selection switch 210 for selecting the high gear position H by means of the driver's operation, the 4WD selection switch 212 for selecting the 4WD state by means of the driver's operation, and the 4WD locking selection switch 214 for selecting the 4WD locking state by means of the driver's operation) are supplied to the electronic control unit 200. As illustrated in FIG. 1, for example, an engine output control command signal Se for output control of the engine 12, an operation command signal Sd for switching of a state of the front-side clutch 36 and a motor drive command signal Sm for controlling a rotation amount of the electric motor 84 are output from the electronic control unit 200 to, e.g., an output control unit of the engine 12, an actuator of the front-side clutch 36 and the electric motor 84, respectively.

In the vehicle 10 configured as described above, as a result of the rotation amount of the electric motor 84 being controlled, an amount of movement (stroke) of the second annular member 82 is controlled. When the fork shaft 102 is in the high gear position, a position in which the front wheel-driving clutch 50 is released as a result of driving the electric motor 84 by a predetermined rotation amount to move the second annular member 82 to the non-pushing side by a predetermined number of strokes from a position in which the pushing portion 82a of the second annular member 82 is in abutment with the frictional engagement element 80 via the thrust bearing 105 is a position in which the vehicle 10 enters into a 2WD running state in which only the rear wheels 16 are driven in the high gear position H (hereinafter referred to as "H2 position"). When the second annular member 82 is in the H2 position, if the front-side clutch 36 is released, in 2WD running, neither rotation from the engine 12 side nor rotation from the front wheel 14 side is transmitted to the respective rotation elements included in a motive power transmission path from the drive gear 46 to the front-wheel differential gear unit 28 (e.g., the drive gear 46, the front wheel-driving chain 56, the driven gear 54, the front wheel-side output shaft 52, the front propeller shaft 24 and the front-wheel differential gear unit 28). Therefore, in 2WD running, rotation of each of the respective rotation elements is stopped, and co-rotation of the respective rotation elements is prevented, which results in decrease in running resistance.

Also, as illustrated in FIG. 2, when the fork shaft 102 is in the high gear position, a position in which the front wheel-driving clutch 50 is in a slipping state as a result of controlling a rotation amount of the electric motor 84 to move the second annular member 82 to the pushing side from a position in which the pushing portion 82a of the second annular member 82 is in abutment with the frictional engagement element 80 via the thrust bearing 105 is a position in which the vehicle 10 enters into a 4WD running state in which motive power is transmitted to both the front wheels 14 and the rear wheels 16 in the high gear position H (hereinafter referred to as "H4 position"). When the second annular member 82 is in the H4 position, a transmitted torque in the front wheel-driving clutch 50 is controlled according to a pushing force of the pushing portion 82a of the second annular member 82, whereby distribution of torque to the front wheels 14 and the rear wheels 16 is adjusted as necessary.

Also, as illustrated in FIG. 4, when the fork shaft 102 is in the low gear position, the front wheel-driving clutch 50 is in a released state and the 4WD locking mechanism 58 is in an engagement state, and thus, the low gear position is a position in which the vehicle 10 enters into a 4WD running state in a 4WD locked state in the low gear L (referred to as "L4 position").

As described above, upon the first annular member 92 being driven to rotate by the electric motor 84, the second annular member 82 moves to the front wheel-driving clutch 50 side and linear motion of the second annular member 82 is thereby transmitted to the front wheel-driving clutch 50 via the first transmission mechanism 88a. Also, upon the first annular member 92 being driven to rotate by the electric motor 84, the drum cam portion 92c connected to the first annular member 92 pivots and the cam engagement member 103 engaging with the cam groove 92f moves in the third axis line C3 direction of the fork shaft 102 and linear motion of the cam engagement member 103 is thereby transmitted to the high/low switching mechanism 48 via the fork 104. Consequently, in order to perform switching operation of the high/low switching mechanism 48, the drum cam portion 92c is connected integrally to the first annular member 92 of the ball cam 86 provided on the rear wheel-side output shaft 44, eliminating the need to provide a drum cam on a fork shaft as opposed to conventional techniques and thus favorably enabling decrease in distance between the rear wheel-side output shaft 44 and the fork shaft 102 and downsizing of the transfer 22. Furthermore, linear motion of the second annular member 82 in the ball cam 86 provided on the rear wheel-side output shaft 44 is transmitted to the front wheel-driving clutch 50 via the first transmission mechanism 88a, eliminating the need to provide, for example, a ball cam and a lever for adjustment of transmitted torque in a clutch as opposed to the conventional techniques, and thus favorably enabling decrease in distance between the rear wheel-side output shaft 44 and the fork shaft 102 and downsizing of the transfer 22.

Also, according to the present embodiment, the second support bearing 73 that rotatably supports the end portion on the drum cam portion 92c side from among the opposite end portions of the rear wheel-side output shaft 44 is disposed inside the drum cam portion 92c so as to overlap with the range of the length in the first axis line C1 of the drum cam portion 92c, and thus, the dimension in the first axis line C1 direction of the rear wheel-side output shaft 44 of the transfer 22 is favorably decreased.

Also, according to the present embodiment, the cam groove 92f formed in the drum cam portion 92c includes the inclined cam groove 92g extending in a direction inclined relative to the first axis line C1, and upon the drum cam portion 92c being made to pivot around the first axis line C1 by the electric motor 84, the cam engagement member 103 is moved in the third axis line C3 direction of the fork shaft 102 along the inclined cam groove 92g of the drum cam portion 92c by a movement amount D that is larger than an amount of movement in the first axis line C1 direction of the second annular member 82. Thus, responsiveness to switching between the high gear H and the low gear L in the high/low switching mechanism 48 is substantially enhanced compared to, for example, those that switch between the high gear H and the low gear L by means of movement in the first axis line C1 direction of the second annular member 82 in the ball cam 86.

Also, according to the present embodiment, the cam engagement member 103 transmits movement in the first axis line C1 direction of the cam engagement member 103 to the fork shaft 102 via the spring member 112. Thus, in switching between the high gear H and the low gear L in the high/low switching mechanism 48, an impact resulting from switching via the high/low switching mechanism 48 is absorbed by the spring member 112.

Also, according to the present embodiment, the front wheel-driving clutch 50 is a clutch that adjusts a torque to be transmitted to the drive gear 46, and the front wheel-driving clutch 50 is a multi-plate wet clutch. Thus, continuous variable control of transmitted torque by the front wheel-driving clutch 50 is possible, enabling enhanced control of driving force distribution to the front wheels 14L, 14R and the rear wheels 16L, 16R according to a driving status.

Although an embodiment of the present invention has been described in detail above with reference to the drawings, the present invention is also employed for other modes.

For example, although in the above-described embodiment, the transfer 22 includes the front wheel-driving clutch 50 that adjusts a torque to be transmitted to the drive gear 46, instead of the front wheel-driving clutch 50, a clutch, that is, a dog clutch (mesh clutch) that transmits a part of motive power of the rear wheel-side output shaft 44 to the drive gear 46 or shuts off the transmission may be provided.

Also, although in the above-described embodiment, in the ball cam 86, the first annular member 92 is driven to rotate by the electric motor 84 and the second annular member 82 is thereby moved in the first axis line C1 direction of the rear wheel-side output shaft 44, the structure of the ball cam 86 may be changed, for example, in such a manner that the second annular member 82 is driven to rotate by the electric motor 84 and the second annular member 82 is thereby moved in the first axis line C1 direction of the rear wheel-side output shaft 44. Here, if the second annular member 82 is driven to rotate by the electric motor 84 as described above, the first annular member 92 is supported by, e.g., the case so as to be unmovable in the first axis line C1 direction of the rear wheel-side output shaft 44 and be unpivotable around the first axis line C1, and the second annular member 82 is supported on the rear wheel-side output shaft 44 so as to be movable in the first axis line C1 direction of the rear wheel-side output shaft 44 and be pivotable around the first axis line C1 of the rear wheel-side output shaft 44. Also, the drum cam portion 92c is connected integrally to the second annular member 82. Consequently, upon the second annular member 82 being driven to rotate by the electric motor 84, the second annular member 82 moves in the first axis line C1 direction of the rear wheel-side output shaft 44 and linear motion of the second annular member 82 is thereby transmitted to the front wheel-driving clutch 50 via the first transmission mechanism 88a. Furthermore, upon the second annular member 82 being driven to rotate by the electric motor 84, the drum cam portion 92c connected integrally to the second annular member 82 pivots, the cam engagement member 103 engaging with the cam groove 92f moves in the third axis line C3 direction of the fork shaft 102 and linear motion of the cam engagement member 103 is thereby transmitted to the high/low switching mechanism 48 via the second transmission mechanism 88b.

Also, although in the above-described embodiment, the drum cam portion 92c is connected integrally to the first annular member 92, it is also possible that for example, the first annular member 92 and the drum cam portion 92c, that is, a drum cam are manufactured as separate parts and the first annular member 92 and the drum cam are integrally connected by means of, for example, welding.

Also, although in the above-described embodiment, the ball cam 86 is connected indirectly to the electric motor 84 via the worm drive 90, the present invention is not limited to this mode. For example, the first annular member 92 in the ball cam 86 and the electric motor 84 may be directly connected with no worm drive 90 interposed therebetween. More specifically, the first annular member 92 and the electric motor 84 may be directly connected so that a pinion provided on the motor shaft of the electric motor 84 and gear teeth formed at the first annular member 92 engage with each other.

Also, although the above-described embodiment indicates a FR-based four-wheel drive vehicle as an example of the vehicle 10 in which the transfer 22 is employed, the present invention is not limited to this example. For example, the vehicle 10 in which the transfer 22 is employed may be a front-engine front-wheel-drive (FF)-based four-wheel drive vehicle. Also, the transfer 22 may include neither the gear position holding mechanism 120 nor the low gear position detection switch 130.

Also, although in the above-described embodiment, the front wheel-driving clutch 50 is a multi-plate wet clutch, the present invention may be employed even if the front wheel-driving clutch 50 is another type of clutch such as a single-plate clutch.

Also, although in the above-described embodiment, for the engine 12 indicated as an example of a driving force source, for example, an internal combustion engine such as a gasoline engine or a diesel engine is used. Also, for a driving force source, for example, a prime mover such as a motor can be employed solely or in combination with the engine 12. Also, the transmission 20 is any of various automatic transmissions such as multi-speed planetary gear-type transmissions, continuously variable transmissions, synchromesh parallel 2-axis transmissions (including known DCTs) or known manual transmissions. Also, although the front-side clutch 36 is an electromagnetic dog clutch, the front-side clutch 36 is not limited to this. For example, the front-side clutch 36 may be, e.g., a dog clutch of a type including a shift fork that moves a sleeve in an axis direction in which the shift fork is driven by an electrically-controllable or hydraulically-controllable actuator, or a friction clutch.

The above is definitely one embodiment, and the present invention can be carried out in a mode subjected to various alterations and improvements based on the knowledge of a person skilled in the art.

What is claimed is:

1. A transfer for a vehicle, the transfer comprising:
   an input shaft;
   an output shaft arranged on a common axis that is in common with the input shaft;
   a high/low switching mechanism that changes a speed of rotation of the input shaft and transmits the rotation to the output shaft;
   an output member that outputs motive power to a destination that is different from that of the output shaft;
   a clutch that transmits a part of motive power from the output shaft to the output member or shuts off the transmission, or adjusts a transmitted torque to be transmitted to the output member;
   a motor;
   a ball cam including a first annular member, and a second annular member positioned on the clutch side, the first annular member and the second annular member being each supported on the output shaft so as to be rotatable relative to the output shaft, including respective inclined recess grooves formed in surfaces facing each other and being prevented from moving in the common axis direction, and a spherical rolling element housed in the inclined recess grooves of the first annular member and the second annular member, either of the first annular member and the second annular member being driven to rotate around the common axis by the motor to move the second annular member to the clutch side;

a transmission mechanism that transmits movement in the common axis direction of the second annular member to the clutch;

a fork shaft disposed in parallel to the common axis and supported so as to be movable in an axis direction;

a cam engagement member connected to the fork shaft;

a drum cam including a cam groove formed in an outer peripheral portion, the cam groove engaging with the cam engagement member, being connected to either of the first annular member and the second annular member and pivoting around the common axis to move the cam engagement member to the axis direction of the fork shaft; and a fork connected to the fork shaft, the fork transmitting movement in the axis direction of the fork shaft to the high/low switching mechanism that switches between a high gear and a low gear.

2. The transfer according to claim 1, wherein an output shaft support bearing that rotatably supports an end portion on the drum cam side of the output shaft is disposed inside the drum cam so as to overlap with a range of a length in the common axis direction of the drum cam.

3. The transfer according to claim 1, wherein:

the cam groove formed in the drum cam includes an inclined cam groove extending in a direction inclined relative to the common axis; and when the drum cam is made to pivot around the common axis by the motor, the cam engagement member is moved in the axis direction of the fork shaft along the inclined cam groove of the drum cam by a movement amount that is larger than an amount of movement in the common axis direction of the second annular member.

4. The transfer according to claim 1, wherein the cam engagement member transmits movement in the common axis direction of the cam engagement member to the fork shaft via a spring member.

5. The transfer according to claim 1, wherein the clutch is a clutch that adjusts a torque to be transmitted to the output member, and is a single-plate or multi-plate clutch.

* * * * *